(12) United States Patent
Takamura (10) Patent No.: US 9,715,108 B2
(45) Date of Patent: Jul. 25, 2017

(54) SCANNING OPTICAL APPARATUS (71) Applicant: CANON KABUSHIKI KAISHA, Tokyo (JP)

(72) Inventor: Daisuke Takamura, Fujinomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/990,895

(22) Filed: Jan. 8, 2016

(65) Prior Publication Data

US 2016/0214398 A1    Jul. 28, 2016

(30) Foreign Application Priority Data

Jan. 27, 2015 (JP) .................. 2015-013240
Nov. 27, 2015 (JP) .................. 2015-231762

(51) Int. Cl.
*G02B 26/08* (2006.01)
*G02B 26/12* (2006.01)

(52) U.S. Cl.
CPC .................. *G02B 26/12* (2013.01)

(58) Field of Classification Search
CPC ........ B41J 2/471; G02B 26/12; G02B 26/121; F16C 17/02; H04N 1/024
USPC ................. 359/200.1; 310/91; 348/335
See application file for complete search history.

(56) References Cited

U.S. PATENT DOCUMENTS

| 7,760,228 B2 | 7/2010 | Mamiya | |
|---|---|---|---|
| 2005/0046733 A1* | 3/2005 | Bang | G02B 26/121 348/335 |
| 2011/0169361 A1* | 7/2011 | Park | F16C 17/02 310/91 |

FOREIGN PATENT DOCUMENTS

| JP | 10206775 A | 8/1998 |
| JP | 2007316446 A | 12/2007 |
| JP | 2009276407 A | 11/2009 |
| JP | 2013054082 A | 3/2013 |

* cited by examiner

*Primary Examiner* — Euncha Cherry
(74) *Attorney, Agent, or Firm* — Rossi, Kimms & McDowell LLP (57) ABSTRACT

In a scanning optical apparatus provided with: a deflector including a rotating polygon mirror which deflects incident light; and an optical box which fixes the deflectors in a positioned state, the deflector uses any one of deflectors of a plurality of types having respectively different shapes of a fitting portion, which is fitted into a fit receiving portion provided in the optical box, and the optical box is provided with fit receiving portions of different shapes corresponding to the respective fitting portions of the deflectors of a plurality of types.

8 Claims, 9 Drawing Sheets

FIG. 9B ing mirror is fixed to the rotor, then when a fixed-shaft-type motor is used, the polygon rotating mirror rotates about the shaft. On the other hand, when a rotating-shaft-type motor is used, the rotating polygon mirror rotates with the shaft. In general, a fixed-shaft-type motor has higher rotational accuracy than a rotating-shaft-type motor. The type of motor to be used may also be decided depending on the performance required of the printer.

SCANNING OPTICAL APPARATUS

BACKGROUND OF THE INVENTION

Field of the Invention

The present invention relates to a scanning optical apparatus provided in an image forming apparatus, such as a copying machine, printer, and facsimile machine, which forms an image on a recording medium, such as a sheet.

Description of the Related Art

A laser printer based on an electrophotographic recording method is provided with a scanning optical apparatus which scans a photosensitive body with laser light corresponding to image information. A configuration using a rotating polygon mirror is most commonly used as a deflector for deflecting laser light.

Known configurations of a motor portion for causing the rotating polygonal mirror to rotate include: a fixed-shaft-type motor (sleeve rotation type) in which a rotor turns about a fixed shaft, and a rotating-shaft-type motor in which the rotor is fixed to a rotating shaft. Since the polygon rotating mirror is fixed to the rotor, then when a fixed-shaft-type motor is used, the polygon rotating mirror rotates about the shaft. On the other hand, when a rotating-shaft-type motor is used, the rotating polygon mirror rotates with the shaft. In general, a fixed-shaft-type motor has higher rotational accuracy than a rotating-shaft-type motor. The type of motor to be used may also be decided depending on the performance required of the printer.

A deflector having a rotating polygon mirror is fixed to an optical box, which is a housing of a scanning optical apparatus. In the case of a deflector which uses a fixed-shaft-type motor, the shaft is fitted into and fixed to holes in the optical box. In the case of a deflector which uses a rotating-shaft-type motor, bearings which rotatably hold the shaft are fitted into and fixed to holes in the optical box. Since the diameter of the shaft and the diameter of the bearings are different, then when employing a deflector which uses a fixed-shaft-type motor, it is necessary to design an optical box having small fitting holes, and when employing a deflector which uses a rotating-shaft-type motor, it is necessary to design an optical box having large fitting holes.

In order to suppress costs relating to the printer, it has been envisaged that substantially the same scanning optical apparatus be employed in both a printer A and a printer B which has different characteristics to the printer A. However, in cases where it is necessary to employ a fixed-shaft deflector in the printer A and to employ a rotating-shaft deflector in the printer B, then it may be necessary to design separate optical boxes for the printer A and the printer B, and the effect in reducing costs is diminished.

In Japanese Patent Application Publication No. 2013-054082, a deflector is installed on a connection plate which can be fitted into an optical box. By installing a connection plate on which the deflector is installed, in the optical box, then deflectors of a plurality of types can be installed on an optical box of one type, via the connection plate.

However, in Japanese Patent Application Publication No. 2013-054082, a connection plate is required in order to install deflectors of a plurality of types in an optical box of one type, and the number of components in the scanning optical apparatus therefore rises, leading to an increase in the cost of the apparatus and the assembly steps involved in assembling the scanning optical apparatus.

SUMMARY OF THE INVENTION

It is an object of the present invention to provide a scanning optical apparatus wherein deflectors of a plurality of types can be installed in a common optical box, without increasing the number of components in the scanning optical apparatus.

Another object of the present invention is to provide a scanning optical apparatus, comprising:

a deflector which deflects incident light, the deflector having a shaft and a polygon mirror provided rotatably with respect to the shaft; and an optical box which accommodates the deflector, the optical box having a hole portion into which the shaft is fitted;

wherein a concave portion, the center of which coincides with the center of the hole portion and the internal diameter of which is larger than that of the hole portion, is provided in the optical box.

Another object of the present invention is to provide a scanning optical apparatus, comprising:

a deflector which deflects incident light, the deflector having a rotating shaft, a bearing which rotatably holds the rotating shaft, and a polygon mirror which rotates together with the rotating shaft; and an optical box which accommodates the deflector, the optical box having a concave portion into which the bearing is fitted, wherein a hole portion, the center of which coincides with the center of the concave portion and the internal diameter of which is smaller than that of the concave portion, is provided in the optical box.

Another object of the present invention is to provide a scanning optical apparatus, comprising:

a deflector which deflects incident light, the deflector including a shaft and a polygon mirror provided rotatably with respect to the shaft; and an optical box which accommodates the deflector, the optical box having a hole portion into which the shaft is fitted, wherein an annular groove, the center of which coincides with the center of the hole portion and which is disposed about the periphery of the hole portion, is provided in the optical box.

Another object of the present invention is to provide a scanning optical apparatus, comprising:

a deflector which deflects incident light, the deflector having a rotating shaft, a bearing which rotatably holds the rotating shaft, and a polygon mirror which rotates together with the rotating shaft; and an optical box which accommodates the deflector, wherein an annular projecting portion is provided in the bearing; and an annular groove into which the projecting portion fits, and a hole portion, the center of which coincides with the center of the annular groove and which is provided nearer to the center than the annular groove, are provided in the optical box.

Further features of the present invention will become apparent from the following description of exemplary embodiments (with reference to the attached drawings).

DESCRIPTION OF THE EMBODIMENTS

Embodiments of the present invention are described below with reference to the drawings. The dimensions, materials, shapes and relative positions, and the like, of the constituent parts described below should be changed appropriately depending on the composition and various conditions of the apparatus to which the invention is applied, and it is not intended to limit the scope of the invention to the description of the embodiments given below.

(First Embodiment)

Figure 1:
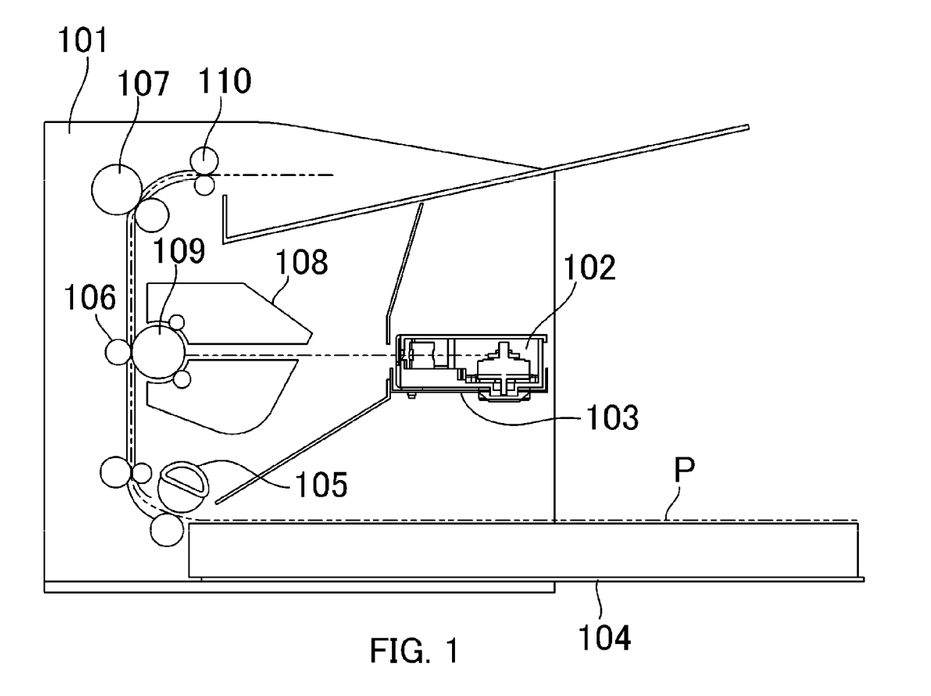
FIG. 1 is a schematic drawing of an image forming apparatus in which the scanning optical apparatus according to a first embodiment is installed.

FIG. 1 is a schematic drawing of an image forming apparatus in which a scanning optical apparatus according to a first embodiment is installed.

The image forming apparatus 101 includes a scanning optical apparatus 102, an optical bench 103, a paper supply unit 104, a paper supply roller 105, a transfer roller 106, a fixing unit 107 and a process cartridge 108. The scanning optical apparatus 102 forms an electrostatic latent image on a photosensitive drum 109 (image bearing member) of the process cartridge 108, by irradiating (emitting) a laser onto a scanned surface of the photosensitive drum 109. The optical bench 103 is one portion of a housing in the image forming apparatus 101, and the scanning optical apparatus 102 is disposed on the optical bench 103.

Furthermore, a recording medium P (recording material) on which images are to be formed is stacked in the paper supply unit 104. The paper supply roller 105 supplies the recording medium P stacked in the paper supply unit 104. The transfer roller 106 transfers the toner image formed on the photosensitive drum 109 of the process cartridge 108, to the recording medium P. The fixing unit 107 fixes the toner image on the recording medium P by pressurizing while heating the toner image that has been transferred onto the recording medium P.

An operation in which an image is formed on a recording medium is now described. When an image forming operation is carried out, an electrostatic latent image is formed on the photosensitive drum 109 by a scanning optical apparatus 102 irradiating a laser onto the photosensitive drum 109 on the basis of image information. The electrostatic latent image formed on the photosensitive drum 109 is converted into a toner image by being developed by a developing apparatus (not illustrated). The toner image formed on the photosensitive drum 109 is transferred by a transfer roller 106 onto the recording medium P conveyed from the paper supply unit 104.

The recording medium P onto which the toner image has been transferred is conveyed to the fixing unit 107, and the toner image is fixed onto the recording medium P due to the recording medium P being pressurized while being heated by the fixing unit 107. The recording medium P on which the toner image has been fixed is subsequently output to the outside of the image forming apparatus 101 by a discharge roller 110.

Figure 2:
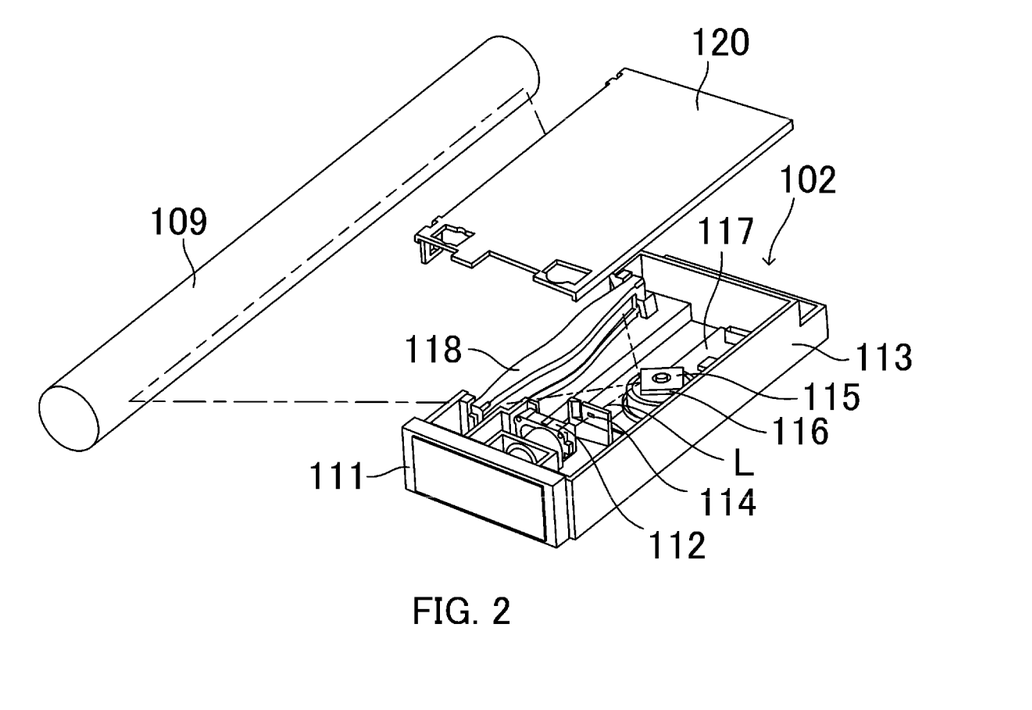
FIG. 2 is a diagram showing a scanning optical apparatus according to the first embodiment.

FIG. 2 is a perspective diagram showing a scanning optical apparatus according to the first embodiment.

The laser beam L (double-dotted line) which is irradiated from the light source apparatus 111 is condensed only in the sub-scanning direction by passing through the cylindrical lens 112. The laser beam L that has passed through the cylindrical lens 112 is restricted to a prescribed beam diameter by an optical aperture 114 which is disposed in an optical box 113 made of black resin, and is condensed on a reflecting surface 116 of the rotating polygon mirror 115.

The rotating polygon mirror 115 is rotated by driving the deflector 117 and deflects the incident laser beam L. An electrostatic latent image is formed on the photosensitive drum 109 due to the deflected laser beam L being scanned over the photosensitive drum 109 after passing through an fθ lens 118. Furthermore, the opening portion of the optical box 113 is closed off by an optical lid 120 which is made of resin or metal, etc.

Figure 3:
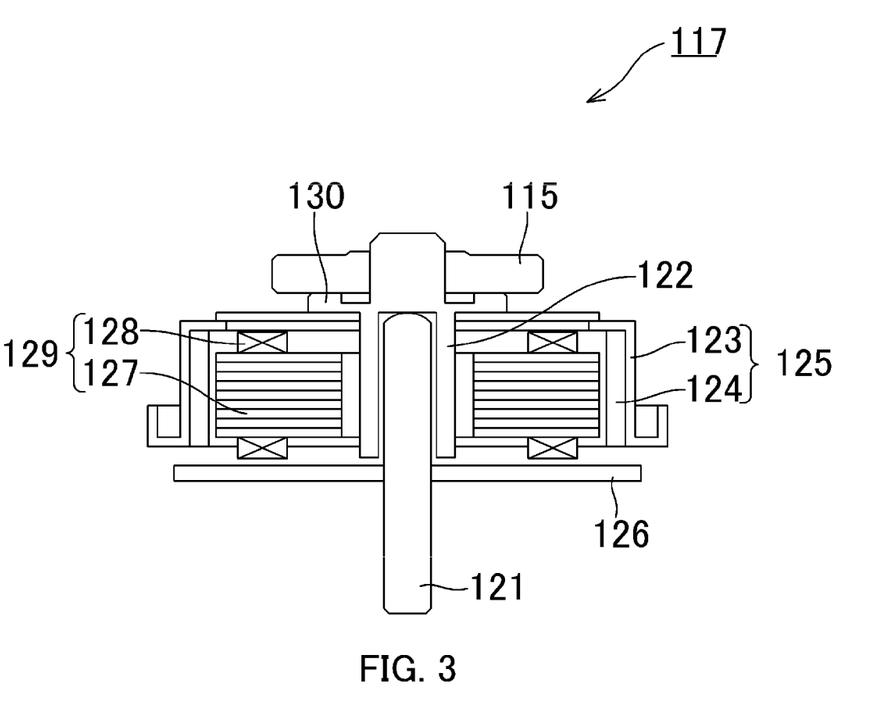
FIG. 3 is a cross-sectional diagram of a deflector which is installed on the scanning optical apparatus according to the first embodiment.

FIG. 3 is a cross-sectional diagram of a deflector which is installed on the scanning optical apparatus according to the first embodiment.

The deflector 117 has a rotating polygon mirror 115, a shaft 121 (fitting portion), a bearing 122, a rotor 125, a circuit substrate 126 and a stator 129. Furthermore, in the deflector 117, the shaft 121, the bearing 122, the rotor 125 and the stator 129 constitute a motor. The deflector 117 is a deflector which uses a fixed-shaft-type motor.

As described above, the rotating polygon mirror 115 deflects the incident laser beam L. Moreover, one end of the shaft 121 is a portion that is fixed to the optical box 113 (see FIG. 2), and the other end is fitted into the bearing 122. The rotor 125 is a portion which rotates in the motor, and includes a yoke 123 and a rotor magnet 124 which are coupled by caulking, or the like, to the bearing 122. The yoke 123 serves to collect the magnetic field of the rotor magnet 124 inside the motor. Furthermore, the stator 129 is a portion which does not rotate in the motor and includes a stator core 127 and a stator coil 128. The stator core 127 is configured by mutually superimposed thin annular steel plates, and is provided with a groove along which the stator coil 128 can be passed. The stator coil 128 is passed through the groove provided in the stator core 127.

The stator 129 is magnetized when a current flows through the stator coil 128. When the stator 129 is magnetized in the magnetic field of the rotor 125, then the rotor 125 rotates due to magnetic properties. The rotating polygon mirror 115 is fixed to a seating surface 130 of a flange portion of the bearing 122, and since the bearing 122 and the rotor 125 are coupled, the rotating polygon mirror 115 rotates due to the rotation of the rotor 125. Furthermore, the shaft 121 projects from the surface of the circuit substrate 126 on the opposite side to the surface where the rotor 125 and the stator 129 are disposed.

Figure 4:
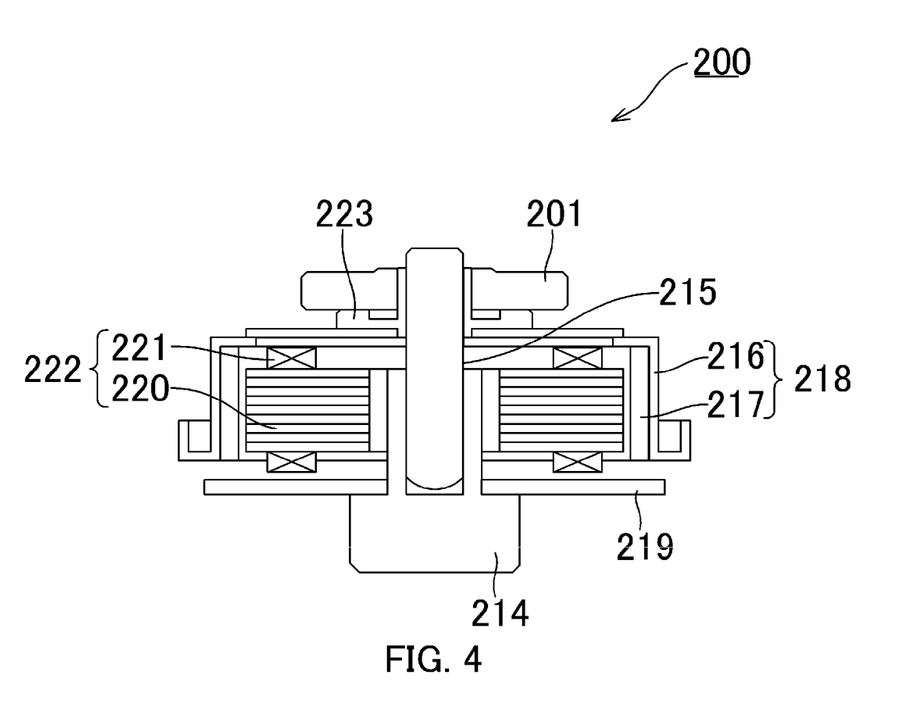
FIG. 4 is a cross-sectional diagram of a deflector which is installed on the scanning optical apparatus according to the first embodiment.

FIG. 4 is a cross-sectional diagram of a deflector which is installed on the scanning optical apparatus according to the first embodiment.

The deflector 200 shown in FIG. 4 is a deflector having a configuration in which the shape of the fitting portion that is fitted into the optical box 113 is different to the deflector 117 shown in FIG. 3. The deflector 200 has a rotating polygon mirror 201, a bearing 214 (fitting portion), a shaft 215, a rotor 218, a circuit substrate 219 and a stator 222. Similarly to the deflector 117, the bearing 214, the shaft 215, the rotor 218 and the stator 222 in the deflector 200 constitute a motor. The deflector 200 is a deflector which uses a rotating-shaft-type motor.

The shaft 215 can be fitted rotatably into the bearing 214, and has a portion which is fitted into the optical box 113. The shaft 215 is fitted into the bearing 214, and holds the rotor 218 and the rotating polygon mirror 201. The rotating polygon mirror 201 is installed on the seating surface 223 of the flange which is installed on the shaft 215. The rotor 218 has a yoke 216 and a rotor magnet 217, and generates a magnetic field inside the motor. Furthermore, the stator 222 has a stator core 220 and a stator coil 221, and is magnetized by passing a current through the stator coil 221.

When the current flows through the stator coil 221, then the stator 222 is magnetized in the magnetic field of the rotor 218, and therefore the rotor 218 rotates due to magnetic properties. Since the rotating polygon mirror 201 and the rotor 218 are held on the shaft 215, then the rotating polygon mirror 201 rotates due to the rotation of the rotor 218. Furthermore, the portion of the bearing 214 which is fitted into the optical box 113 projects from the surface of the circuit substrate 219 on the opposite side to the surface where the motor is configured.

Figure 5:
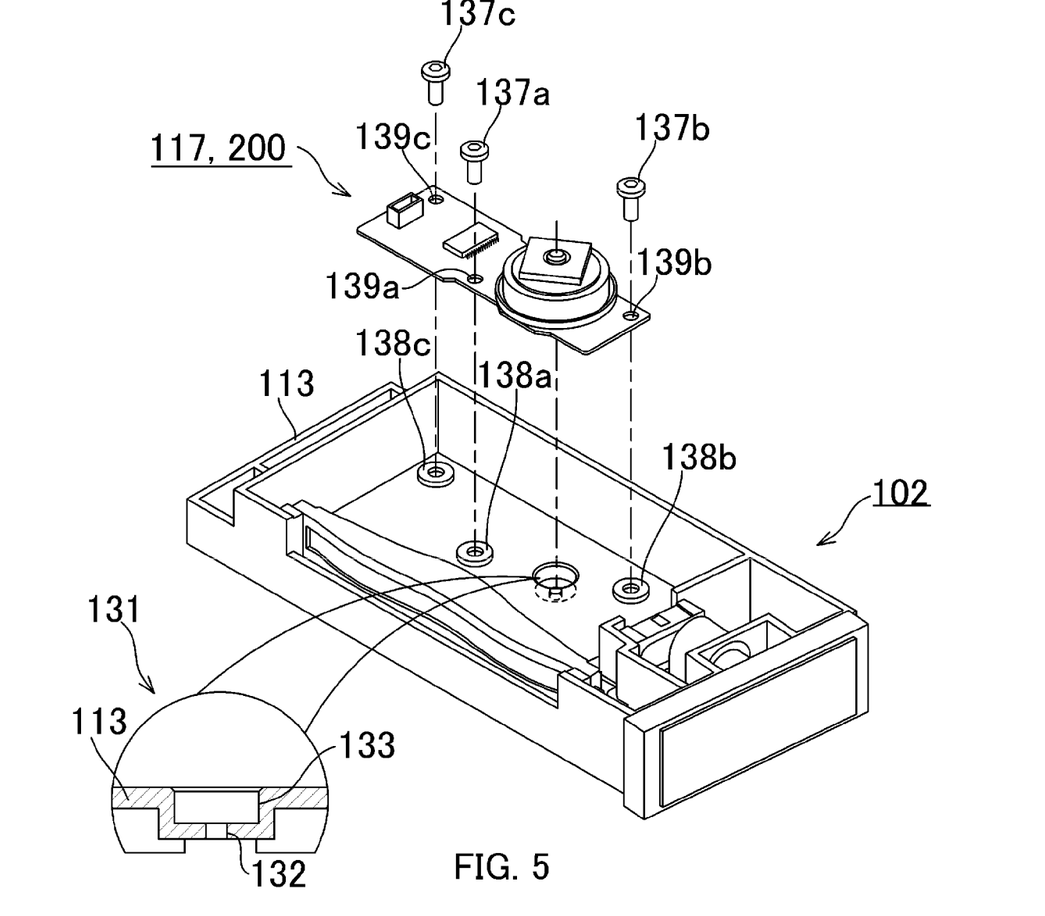
FIG. 5 is a perspective diagram showing a view of the assembly of the scanning optical apparatus according to the first embodiment.

FIG. 5 is a perspective diagram showing a view of the assembly of the scanning optical apparatus according to the first embodiment.

The deflector 117 or the deflector 200 is fixed to the optical box 113 by a bolt 137a, a bolt 137b and a bolt 137c. Firstly, the bolts 137a (137b, 137c) are passed through bolt holes 139a (139b, 139c) which are formed in the deflector 117 or the deflector 200. By inserting the bolts 137a (137b, 137c) which have been passed through the bolt holes 139a (139b, 139c) into seating surfaces 138a (138b, 138c), the deflector 117 or the deflector 200 is fixed to the optical box 113. In other words, the bolt 137a is inserted into the seating surface 138a via the bolt hole 139a, the bolt 137b is inserted into the seating surface 138b via the bolt hole 139b, and the bolt 137c is inserted into the seating surface 138c via the bolt hole 139c.

Here, the optical box 113 is made of resin, or the like, and a fit receiving portion 131 is formed in the bottom surface thereof. The shaft 121 of the deflector 117 and the bearing 214 of the deflector 200 can be fitted into the fit receiving portion 131. The deflector 117 or the deflector 200 may be installed in the optical box 113 by members other than bolts 137a (137b, 137c). For example, the deflector 117 or the deflector 200 may be fixed to the optical box 113 by screws.

Figure 6:
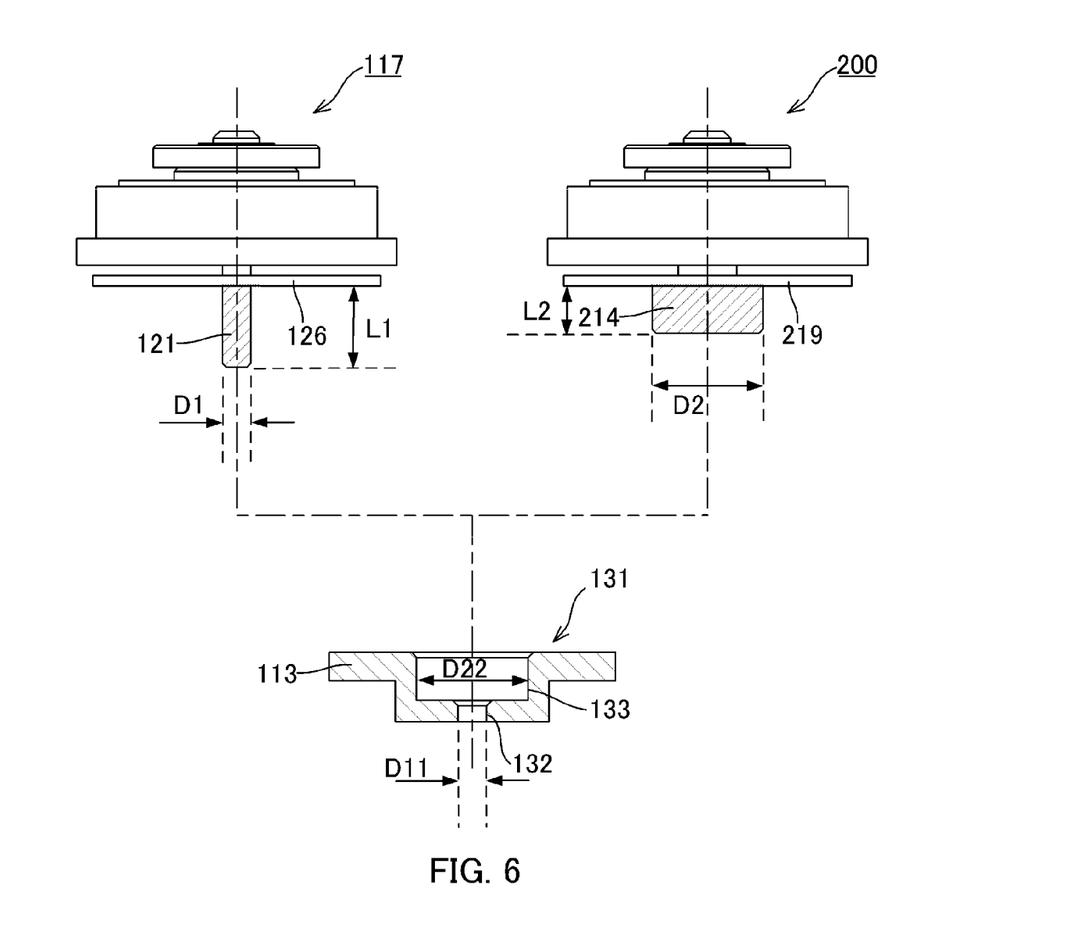
FIG. 6 is a schematic drawing for describing a positioning portion for a deflector in the optical box according to the first embodiment.
Figure 7A:
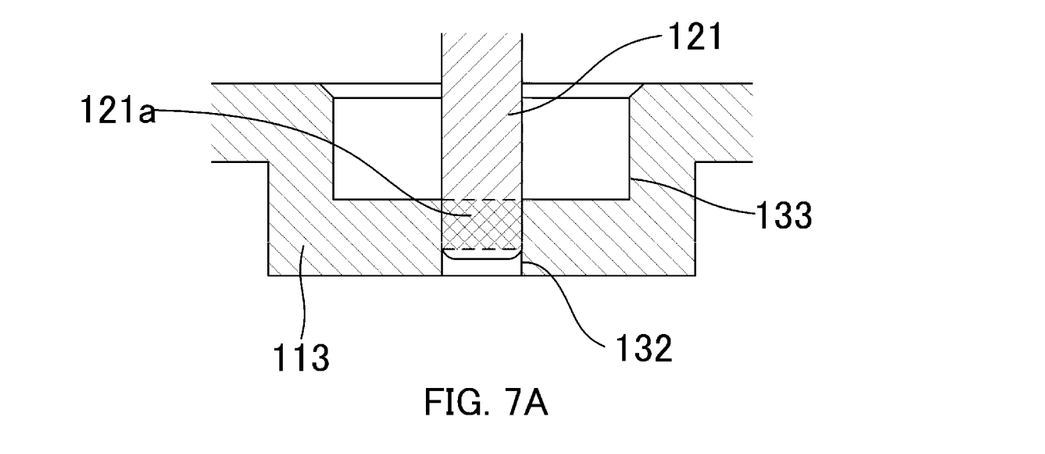
FIG. 7A and FIG. 7B are cross-sectional diagrams showing a state where the deflector is installed in an optical box in the first embodiment.
Figure 7B:
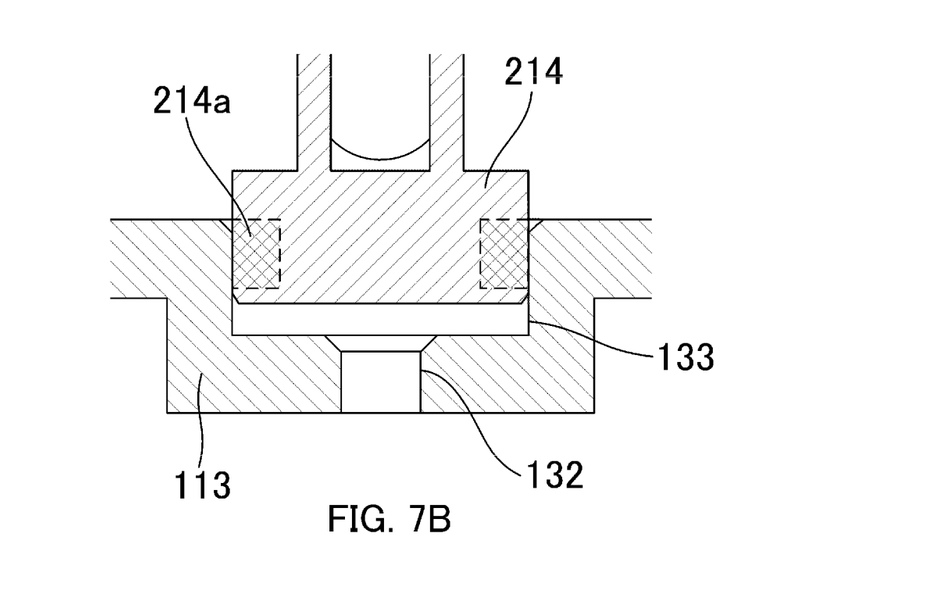

FIG. 6 is a schematic drawing for describing a positioning portion of a deflector in the optical box according to the first embodiment. Furthermore, FIG. 7A and FIG. 7B are cross-sectional diagrams showing a state where the deflector is installed in an optical box in the first embodiment. In FIG. 6, the cross-sectional portions are marked by hatching. The optical box 113 in the scanning optical apparatus 102 can be fixed in a state where the deflector 117 or the deflector 200 is positioned therein. Here, the deflector 117 or the deflector 200 are deflectors having respectively different configurations of the fitting portion for fitting into the fit receiving portion 131 formed in the optical box 113. The fitting portion in the deflector 117 is the shaft 121, and the fit receiving portion in the deflector 200 is the bearing 214. The fit receiving portion 131 formed in the optical box 113 can receive fitting of both the shaft 121 of the deflector 117 and the bearing 214 of the deflector 200.

The length L1 of the portion of the shaft 121 of the deflector 117 which projects from the circuit substrate 126 is greater than the length L2 of the portion of the bearing 214 of the deflector 200 which projects from the circuit substrate 219. Furthermore, the diameter D1 of the shaft 121 is smaller than the diameter D2 of the bearing 214.

On the other hand, the fit receiving portion 131 provided in the optical box has a small-diameter portion 132 (hole portion) into which the shaft 121 of the deflector 117 is fitted, and a large-diameter portion (concave portion) 133 into which the bearing 214 of the deflector 200 is fitted. The large-diameter portion 133 is formed in a base portion of the optical box 113 and has an inner circumferential surface corresponding to an outer circumferential surface of an outer-diameter positioning portion 214a of the bearing 214. Furthermore, the small-diameter portion 132 is formed in a bottom portion of the large-diameter portion 133, and has an inner circumferential surface corresponding to the outer circumferential surface of the shaft 121. Here, the diameter D22 of the large-diameter portion 133 is greater than the diameter D11 of the small-diameter portion 132, and the central axis line of the small-diameter portion 132 and the central axis line of the large-diameter portion 133 are positioned on the same axis line (coaxially). In the central axial direction of the small-diameter portion 132 and the large-diameter portion 133, the small-diameter portion 132 is disposed further from the rotating polygon mirror 115 of the deflector 117 than the large-diameter portion 133. In this way, the optical box 113 is an integrated molded body having a small-diameter portion (hole portion) 132 and a large-diameter portion (concave portion) 133. The internal diameter D22 of the large-diameter portion 133 is two to four times the internal diameter D11 of the small-diameter portion (the internal diameter of the small-diameter portion 132 is ½ to ¼ of the internal diameter of the large-diameter portion).

When the deflector 117 is positioned in the optical box 113, the positioning portion 121a, which is the portion of the shaft 121 near the end of the shaft 121 on the opposite side to the side, where the rotating polygon mirror 115 is disposed, in the axial direction, is fitted into the small-diameter portion 132 in the fit receiving portion 131. Furthermore, when the deflector 200 is positioned in the optical box 113, the positioning portion 214a which is the portion of the bearing 214 near the end of the bearing 214 that is on the opposite side to the side, where the rotating polygon mirror 201 is disposed, in the axial direction, is fitted into the large-diameter portion 133. By adopting a configuration of this kind, it is possible to provide a scanning optical apparatus having a deflector 117 and a scanning optical apparatus having a deflector 200, by using an optical box of the same shape, without having to use optical boxes having mutually different shapes for the deflector 117 and the deflector 200. An optical box of the same shape means, in the case of an optical box which is a resin molding, for example, a box molded from resin using substantially the same mold.

According to the present embodiment, it is not necessary to manufacture optical boxes of a plurality of types in accordance with the type of deflector, and the manufacturing costs can be reduced accordingly.

(Second Embodiment)

Figure 8:
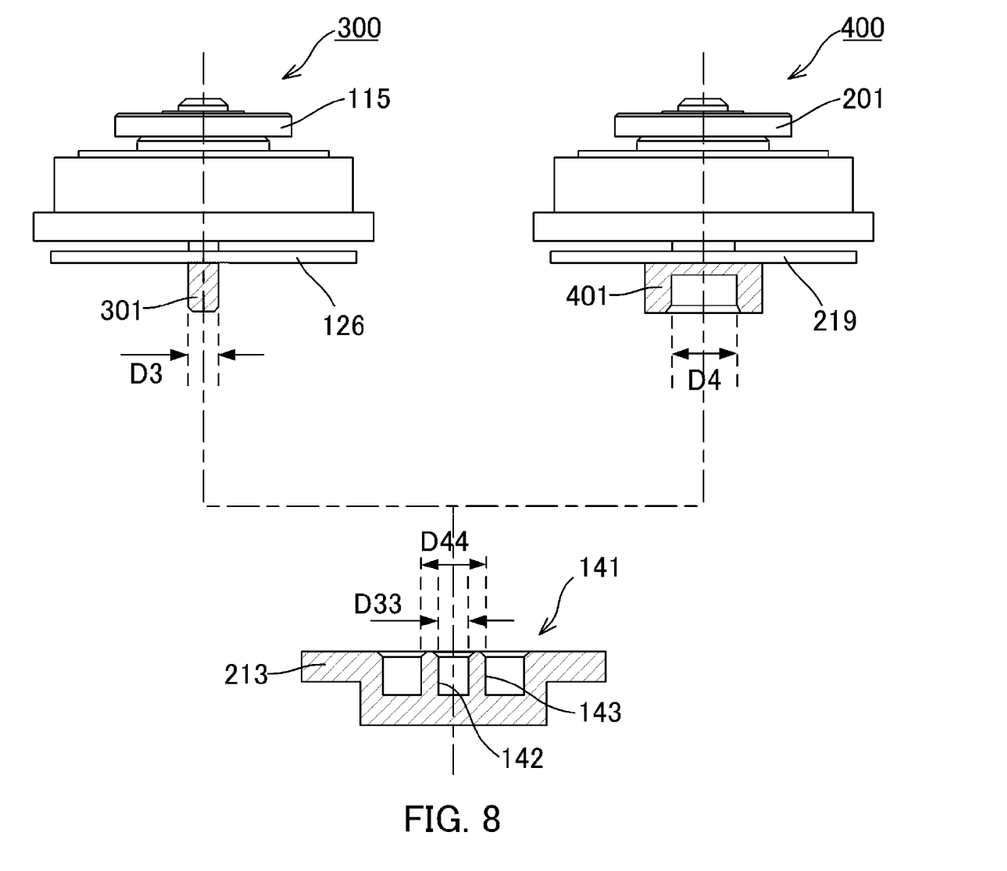
FIG. 8 is a schematic drawing for describing a positioning portion for a deflector in the optical box according to the second embodiment.
Figure 9A:
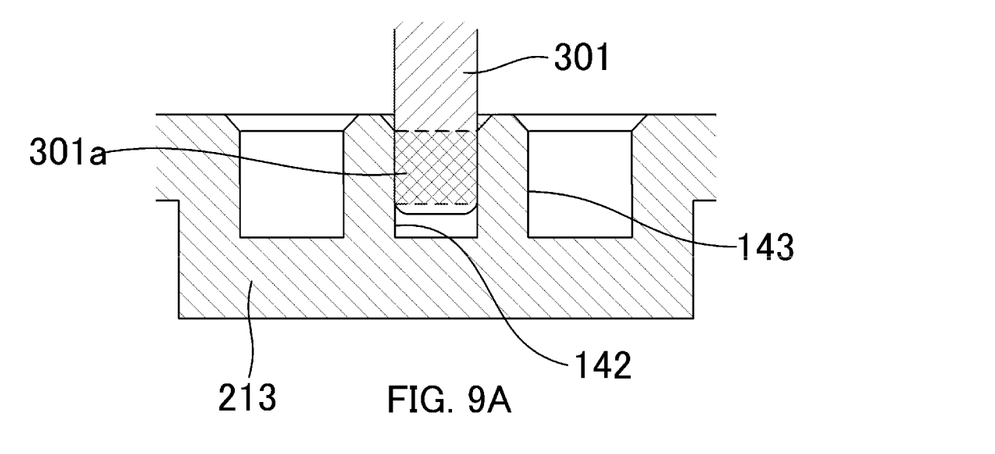
FIG. 9A and FIG. 9B are cross-sectional diagrams showing a state where the deflector is installed in an optical box in the second embodiment.
Figure 9B:
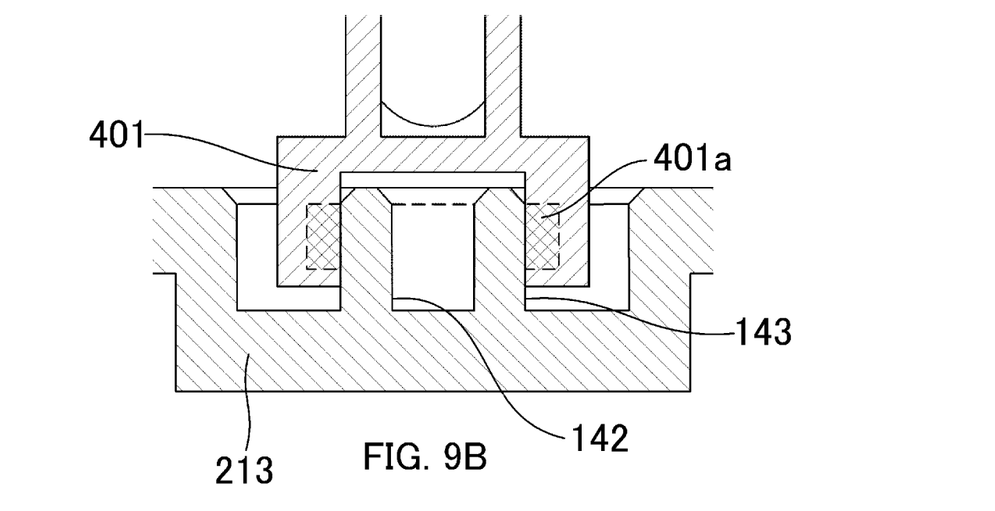

Below, a second embodiment of the present invention is now described. In the second embodiment, the shape of the fitting portion in the deflector and the fit receiving portion in the optical box are different to the first embodiment. In the second embodiment, the portions which have the same functions as the first embodiment are labelled with the same reference numerals and description thereof is omitted here. FIG. 8 is a schematic drawing for describing a positioning portion for a deflector in the optical box according to the second embodiment. Furthermore, FIG. 9A and FIG. 9B are cross-sectional diagrams showing a state where the deflector is installed in an optical box in the second embodiment. In FIG. 8, the cross-sectional portions are marked by hatching.

It is possible to install either one of a deflector 300 (third deflector) which has a shaft 301 (fitting portion) and a deflector 400 (fourth deflector) which has a bearing 401 (fitting portion) in the optical box 213 of the second embodiment. A fitting hole 142 (hole portion) into which the shaft 301 of the deflector 300 is fitted, and an annular groove 143 into which the bearing 401 of the deflector 400 is fitted are formed in the optical box 213.

The portion of the shaft 301 of the deflector 300 which projects from the circuit substrate 126 has approximately the same length in the direction perpendicular to the circuit substrate 126 (219), as the portion of the bearing 401 of the deflector 400 which projects from the circuit substrate 219. Furthermore, the external diameter D3 of the shaft 301 is smaller than the internal diameter D4 of a cylindrical positioning portion 401a in the bearing 401.

Moreover, a fit receiving portion 141 is configured by a fitting hole (hole portion) 142 into which the shaft 301 of the deflector 300 is fitted, and an annular groove 143 into which the bearing 401 of the deflector 400 is fitted. The annular groove 143 is an annular groove which is formed in the bottom portion of the optical box 213, and the fitting hole 142 is a concave portion which is formed inside the annular groove 143. The fitting hole 142 has an inner circumferential surface which corresponds to the outer circumferential surface of the shaft 301, and the annular groove 143 has an outer circumferential surface which corresponds to the inner circumferential surface of the positioning portion 401a. The external diameter D44 of the wall on the center side of the annular groove 143 is greater than the internal diameter D33 of the fitting hole 142, and the central axis line of the fitting hole 142 and the central axis line of the annular groove 143 are positioned on the same axis line (coaxially). In other words, the annular groove 143 is provided concentrically about the periphery of the fitting hole 142. The external diameter D44 of the wall on the center side of the annular groove is two to four times the internal diameter D33 of the fitting hole 142 (the internal diameter D33 of the fitting hole 142 is ½ to ¼ times the external diameter D44 of the wall on the center side of the annular groove).

When the deflector 300 is positioned in the optical box 213, the positioning portion 301a on the shaft 301 fits with the fitting hole 142 in the fit receiving portion 141. Here, the positioning portion 301a is a portion near the end of the shaft 301 on the opposite side to the side, where the rotating polygon mirror 115 is disposed, in the axial direction of the shaft 301. Furthermore, when the deflector 400 is positioned in the optical box 213, the positioning portion 401a, which is the portion of the bearing 401 near the end of the bearing 401 on the opposite side to the side, where the rotating polygon mirror 201 is disposed, in the axial direction, is fitted into the annular groove 143.

As described above, in each of the embodiments, it is possible to install deflectors of a plurality of types in a common optical box, by providing fit receiving portions corresponding to the deflectors of a plurality of types, in one optical box. Consequently, it is possible to install deflectors of a plurality of types in a common optical box, without increasing the number of components in the scanning optical apparatus. Furthermore, it is possible to install deflectors of a plurality of types in a common optical box, without increasing the number of assembly steps of the scanning optical apparatus.

By adopting a configuration of this kind, it is possible to provide a scanning optical apparatus having a deflector 300 and a scanning optical apparatus having a deflector 400, by using an optical box of the same shape, without having to use optical boxes having mutually different shapes for the deflector 300 and the deflector 400. An optical box of the same shape means, in the case of an optical box which is a resin molding, for example, a box molded from resin using substantially the same mold.

According to the present embodiment, it is not necessary to manufacture optical boxes of a plurality of types in accordance with the type of deflector, and the manufacturing costs can be reduced accordingly.

Furthermore, in the second embodiment, since the fitting hole and the annular groove in the optical box are formed at different positions in the radial direction of the fitting hole and the annular groove, then the depths of the fitting hole and the annular groove can be made substantially the same. Consequently, it is possible to reduce the depth of the fitting hole and the annular groove, the height of the scanning optical apparatus in the direction perpendicular to the bottom surface of the optical box becomes lower, and the scanning optical apparatus can be made compact in size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-013240, filed Jan. 27, 2015, and Japanese Patent Application No. 2015-231762, filed Nov. 27, 2015, which are hereby incorporated by reference herein in its entirety.

What is claimed is:

1. A scanning optical apparatus, comprising:
    a deflector which deflects incident light, the deflector having a fixed-shaft and a polygon mirror provided rotatably with respect to the shaft;
    a lens through which the light from the deflector passes; and
    an optical box which accommodates the deflector and the lens, the optical box having a hole portion into which the shaft is fitted;
    wherein a concave portion, the center of which coincides with the center of the hole portion and the internal diameter of which is larger than that of the hole portion, is provided in the optical box.

2. The scanning optical apparatus according to claim 1, wherein the internal diameter of the concave portion is two to four times the internal diameter of the hole portion.

3. A scanning optical apparatus, comprising:
    a deflector which deflects incident light, the deflector having a rotating shaft, a bearing which rotatably holds the rotating shaft, and a polygon mirror which rotates together with the rotating shaft;
    a lens through which the light from the deflector passes; and an optical box which accommodates the deflector and the lens, the optical box having a concave portion into which the bearing is fitted, wherein a hole portion, the center of which coincides with the center of the concave portion and the internal diameter of which is smaller than that of the concave portion, is provided in the optical box.

4. The scanning optical apparatus according to claim 3, wherein the internal diameter of the hole portion is ½ to ¼ times the internal diameter of the concave portion.

5. A scanning optical apparatus, comprising:

a deflector which deflects incident light, the deflector having a fixed-shaft and a polygon mirror provided rotatably with respect to the shaft;

a lens through which the light from the deflector passes; and an optical box which accommodates the deflector and the lens, the optical box having a hole portion into which the shaft is fitted, wherein an annular groove, the center of which coincides with the center of the hole portion and which is disposed about the periphery of the hole portion, is provided in the optical box.

6. The scanning optical apparatus according to claim 5, wherein an external diameter of a wall of the annular groove on the side of the center is two to four times the internal diameter of the hole portion.

7. A scanning optical apparatus, comprising:

a deflector which deflects incident light, the deflector having a rotating shaft, a bearing which rotatably holds the rotating shaft, and a polygon mirror which rotates together with the rotating shaft;

a lens through which the light from the deflector passes; and an optical box which accommodates the deflector and the lens, wherein an annular projecting portion is provided in the bearing, and wherein an annular groove into which the projecting portion fits, and a hole portion, the center of which coincides with the center of the annular groove and which is provided nearer to the center than the annular groove, are provided in the optical box.

8. The scanning optical apparatus according to claim 7, wherein the internal diameter of the hole portion is ½ to ¼ times the external diameter of a wall of the annular groove on the side of the center.

\* \* \* \* \*